United States Patent [19]
Ratz

[11] Patent Number: 5,982,420
[45] Date of Patent: Nov. 9, 1999

[54] AUTOTRACKING DEVICE DESIGNATING A TARGET

[75] Inventor: Stephen G. Ratz, Indianapolis, Ind.

[73] Assignee: The United States of America as represented by the Secretary of the Navy, Washington, D.C.

[21] Appl. No.: 08/790,825

[22] Filed: Jan. 21, 1997

[51] Int. Cl.$^6$ .................................................. H04N 7/18
[52] U.S. Cl. .......................................... 348/171; 348/172
[58] Field of Search ................................. 348/143, 150, 348/151, 152, 153, 154, 155, 169, 170, 171, 172, 214; 244/3.16

[56] References Cited

U.S. PATENT DOCUMENTS

| | | | |
|---|---|---|---|
| 3,257,505 | 6/1966 | Van Wechel | 348/170 |
| 3,320,360 | 5/1967 | Thompson | 348/169 |
| 3,341,653 | 9/1967 | Kruse, Jr. | 348/170 |
| 3,725,576 | 4/1973 | Crawford et al. | 348/170 |
| 3,730,277 | 5/1973 | Brugler | 348/171 |
| 4,123,017 | 10/1978 | Lewis | 348/171 |

*Primary Examiner*—Tommy P. Chin
*Assistant Examiner*—John A. Voisinet
*Attorney, Agent, or Firm*—Ron Billi

[57] ABSTRACT

An automatic tracking device is disclosed that extracts data from the composite video output signal of a camera and uses it to electronically isolate an object in the image information on the video output signal and follows the object with a crosshair added to the video by the autotracking device. The autotracking device generates steering signals that are applied to the camera directing circuits to cause the camera to automatically follow the object as the object moves.

6 Claims, 10 Drawing Sheets

AUTOTRACKING DEVICE DESIGNATING A TARGET

STATEMENT OF GOVERNMENT'S INTEREST

The invention described herein, may be manufactured or used by and for the Government of the United States of America for governmental purposes without the payment of any royalty thereon or therefor.

BACKGROUND OF THE INVENTION

Remotely controlled cameras are found in various applications, such as those in security systems or even those on aircraft that employ infrared radiation to locate a target of interest. For any remotely controlled camera system, it is important that once a target or object comes into the field of view of the camera that the camera be positioned from a remote location, such as a control console, so as to automatically follow the object as the object moves.

Although the feature of automatically tracking an object is desirable, it is not always present in remotely controlled cameras. More particularly, remotely controlled cameras may be moved on a continuous and repetitive basis so as to scan an area of interest, but are lacking in the features of tracking on an object during such a scan. Even though the continuous and repetitive movement of remotely removed cameras may serve well its intended purpose, it is desirable that such a scanning be improved by having the ability to sense and detect for an object within the field of view of the camera and continuously follow that object.

The ability of the remotely controlled camera to automatically follow an object may be even further enhanced if the contrast and brightness of the video data, sometimes referred to as its sensitivity, may be adjusted so as to adapt the tracking of the object to changing environmental situations.

Furthermore, the ability of the remotely controlled camera, whether responsive to visible or infrared radiation, to automatically follow an object must be subordinate to various command and control responses, especially those initiated by an operator. For example, the active pursuit of tracking a viewable object sometimes must be overridden by operator's commands so that the operator may utilize the camera to accomplish a desired task of maneuvering an aircraft on which the camera may find utilization.

Accordingly, remotely controlled cameras having means to automatically follow an object as the object moves need to be adaptable to various conditions and subordinate to the operator's commands positioned at a remote console. Conversely, the operation of remotely controlled cameras not having means to automatically follow an object as it moves could be enhanced if such a feature is added, but this added feature should be accomplished in a relatively simple and inexpensive manner so as to ease the retrofit process for such a remotely controlled camera system.

SUMMARY OF THE INVENTION

The present invention is a stand-alone video tracking device easily added to existing remotely controlled camera systems without extensive modification thereto. The automatic tracking device need only have access to the video output signals of the camera to provide for the ability of having the camera automatically follow an object, serving as a target of interest.

The remotely controlled camera system generates composite video signals containing image signals and synchronization signals and has a display device with deflection control circuits and camera directing circuits responsive to steering signals for causing the movement of the camera. The remotely controlled camera system includes an automatic tracking device comprising means for extracting a preselected portion of the composite video signals so as to isolate object information included in the image signals thereof. The object information in the preselected portion has rising and falling edges having transition rates that exceed a predetermined value. The automatic tracking device further comprises means for providing a reference box for confining and locating the information defining the preselected portion as it is being viewed on the display device. The automatic tracking device further comprises means for generating steering signals that are applied to directing circuits so as to cause the camera to track the object.

Accordingly, it is a primary object of the present invention to provide a remotely controlled camera system with means for automatically following an object as the object moves.

It is another object of the present invention to provide means for adjusting the sensitivity of the automatic tracking systems so as to accommodate different targets by adjusting the contrast and brightness parameters of the object.

It is another object of the present invention to provide means that are easily retrofitted onto remotely controlled camera system that allow the retrofitted camera systems to automatically follow an object as the object moves.

DETAILED DESCRIPTION OF THE PREFERRED EMBODIMENTS

Figure 1:
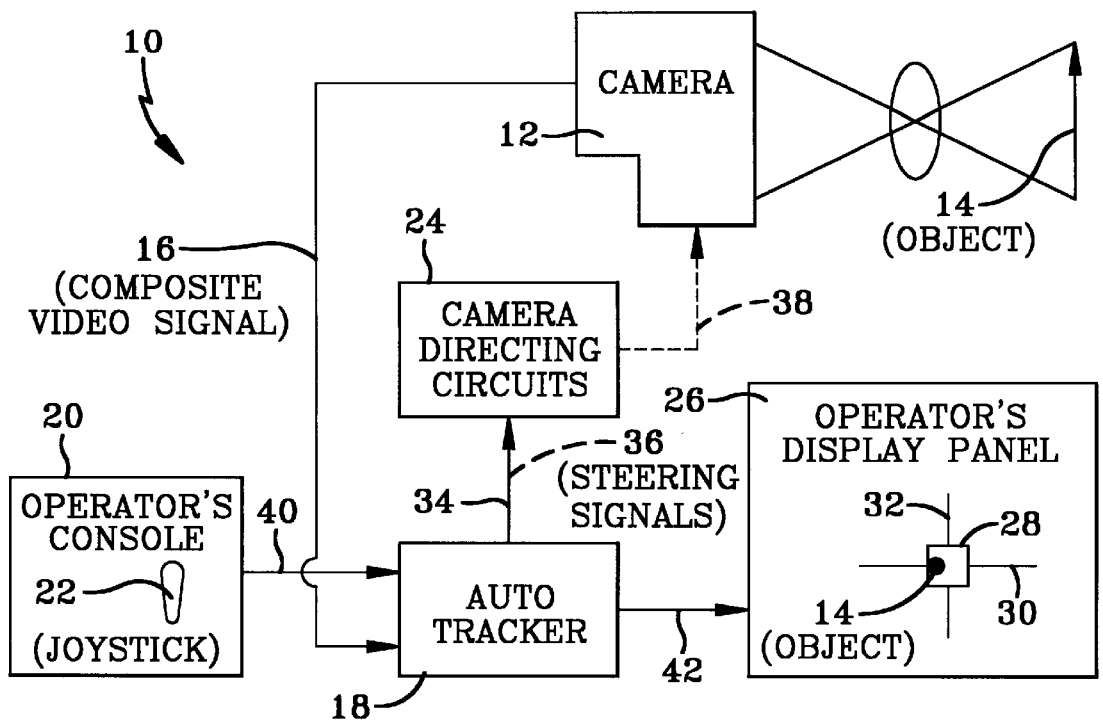
FIG. 1 is a block diagram of one embodiment of the present invention.

With reference to the drawings, wherein the same reference number corresponds to the same element throughout, there is shown in FIG. 1 a control system 10 for a video device, such as a camera 12. The camera 12 has a sensitive surface on which is focused an optical image, such as an object 14. The object 14 may be a target of interest and the control system 10 causes the camera 12 to follow the object, even if the object 14 is moving. The camera 12 is known in the art and may be responsive to visible or infrared radiation, and produces an unmodulated composite video signal 16 containing image information that varies in accordance with a light intensity of the imaged object 14 intercepting the sensitive surface of the camera 12.

The system 10 includes an autotracker 18 which is of primary importance to the present invention, an operator's console 20 preferably having a joystick 22, camera directing circuits 24, and an operator's display panel 26 on which is displayed a rectangular box 28 that is dissected by crosshairs comprising horizontal and vertical lines 30 and 32, respectively, and in which rectangular box 28 is displayed the object 14. As used herein, the rectangular box 28 may be interchangeably referred to as a window or a crosshaired window each serving to define the active, selected portion of the viewing area in which object 14 is displayed. Any object in the viewing area of the display outside the window 28 is ignored but visible.

In general, and as to be more fully described with reference to FIGS. 3–10, the autotracker 18 has means for extracting the information of a preselected portion of the composite video signal 16 so as to isolate the information defining the object 14. The preselected portion has edges whose changes are defined by a transition rate that exceeds a predetermined value. More particularly, the edges have rising and falling sections indicative of the intensity changes of the object 14 impinging the camera 12 that exceed a predetermined transition rate to thereby supply information to the practice of the present invention that an object is within the field of view of the camera 12. The autotracker 18 further comprises means for providing the viewable rectangular box 28 and crosshairs 30 and 32. The autotracker 18 has means for examining the unmodulated composite video signal 16 and providing appropriate steering signals 36 on signal path 34 that are routed to the camera directing circuits 24 to steer the camera 12. The camera directing circuits 24 also receive information from signal path 40 via autotracker 18, to be described hereinafter. The steering signals 36 cause the camera 12 to track the object 14. The unmodulated composite signal 16 applied to the autotracker 18 may be further described with reference to FIG. 2.

Figure 2:
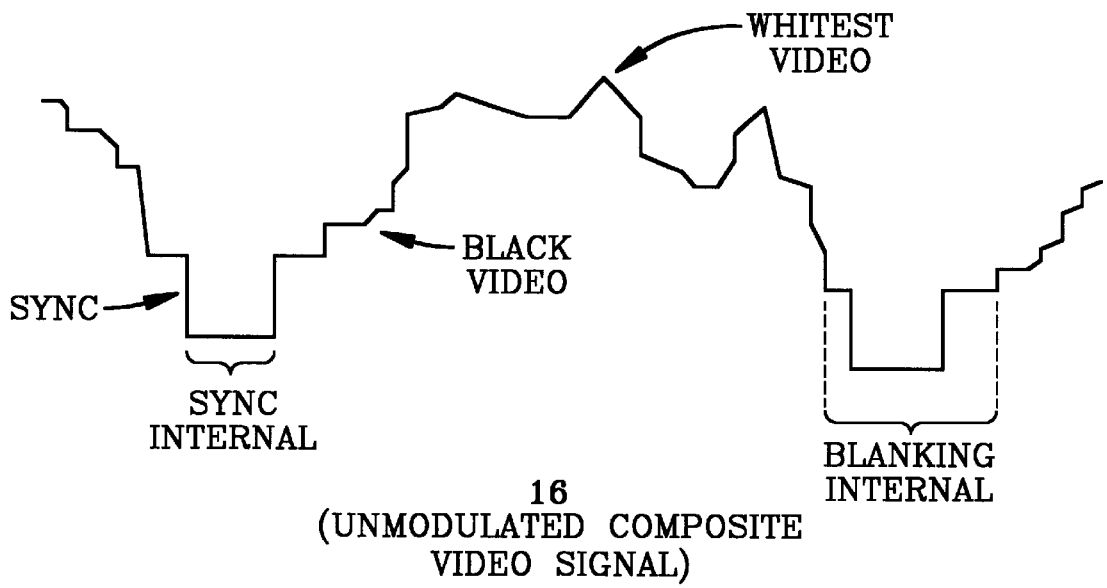
FIG. 2 illustrates the unmodulated composite video output signal of the remotely controlled camera of FIG. 1.
Figure 3:
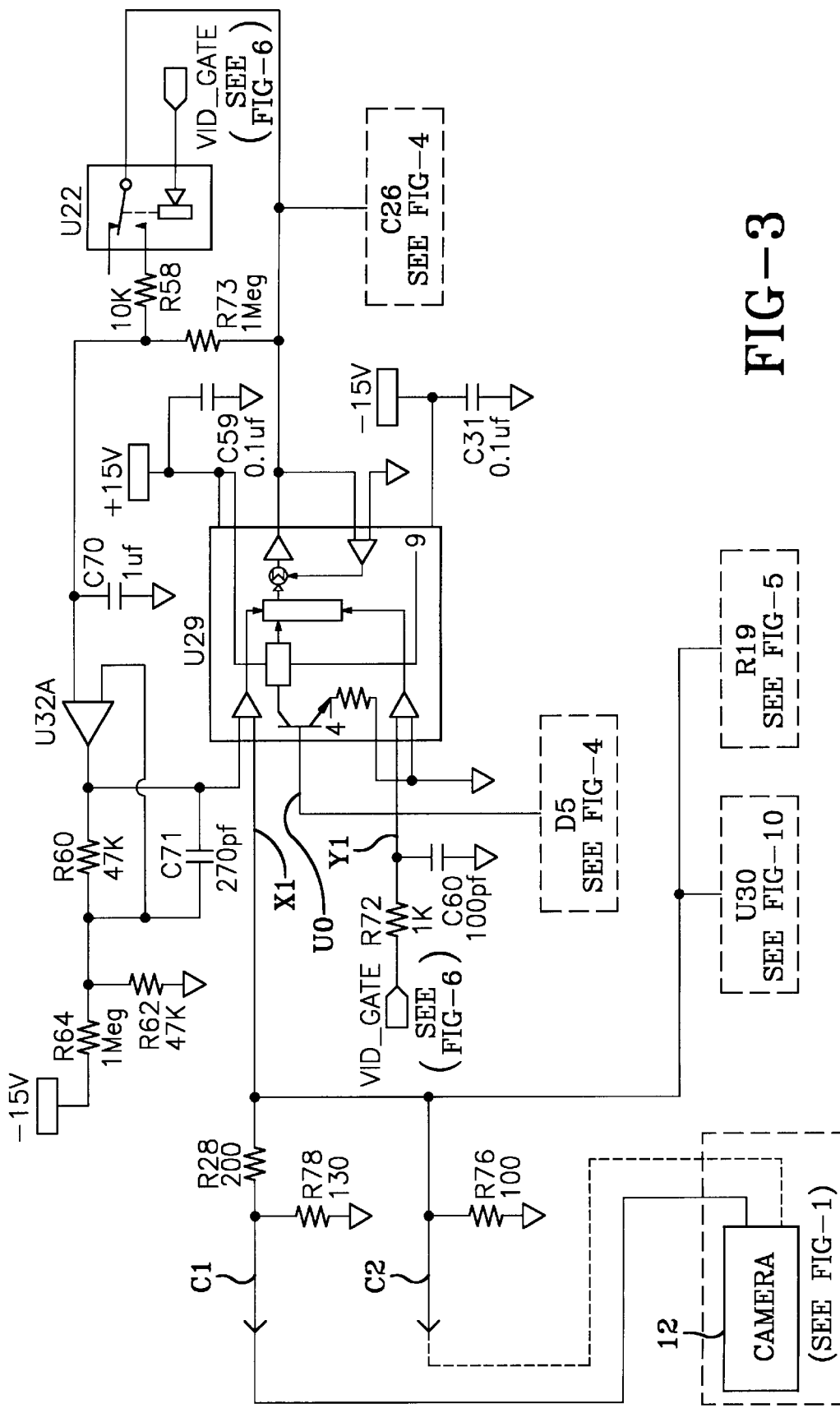
FIG. 3 is a schematic for the circuitry of the present invention including a normalizing circuit, automatic gain control (AGC) and a dc restorer.

FIG. 2 illustrates the unmodulated composite video signal 16 as typically containing image information and pulses. More particularly, the composite video signal 16 comprises image signals indicated in FIG. 2 by regions, for example, black video, whitest video, blanking and synchronization (sync) intervals and synchronizing (sync) signals from which the horizontal and vertical synchronization signals are derived therefrom. The unmodulated composite signal 16 of FIG. 2 is applied to pins C1 and C2 shown in FIG. 3 of the autotracker 18, wherein the composite video signals are normalized to a predetermined value. FIG. 3 along with FIGS. 4–11 are schematics of the autotracker 18 and illustrate a plurality of elements represented by symbols known in the art and having typical values as shown therein. Further, the elements of FIGS. 3–11 are arranged in a conventional manner unless otherwise described herein.

The composite video signal 16 at pins C1 and C2 of FIG. 3 of the autotracker 18 is normalized to one volt to compensate for the differences in the video systems in which the present invention may be applied. The composite video signal 16 is separately carried by two signal paths one for each application such as those used on aircrafts. For example, if it is anticipated that the present invention is to be practiced on two different aircrafts, each having different parameters, then two separate signal paths (one shown in phantom in FIG. 3) are provided to accommodate both types of aircraft. It should be noted that the two separate input paths should not be connected at the same time. The combination of R28, R76 and R78 acting as a normalizing circuit attenuates the amplitude and matches the impedance of the two inputs signal paths.

This normalized video level is typically one volt from sync tip, that is, the tip of sync pulse of FIG. 2, to whitest signal, but only the peak-to-peak video information in a small window in the center of the crosshairs, to be discussed later, is significant and was previously referred to with reference to FIG. 1 as being the rectangular box or window 28. More particularly, the object 14 information contained within the rectangular box 28, as shown in FIG. 1, is of prime importance to the present invention. As used herein, the terms "video" and "image" are given in an interchangeable manner when describing the information comprising the object 14, the amplitude of which varies in accordance with the light intensities of the object 14 focused onto camera 12.

The amplitude of the small window video changes rapidly and is usually only a small percentage of the total level. This portion of the video is stripped away from the sync pulse and other video signals and renormalized to a one-volt level. The normalized video signal, that is, the output of resistor R28 is provided to the X1 input of a four-quadrant-multiplier, U29, which performs as an analog gate, variable-gain amplifier. The output of U29 is applied to U32A serving as a dc restoring error amplifier for the video signal. All video outside the window is gated-off at U29 by switching the Y1 input of U29 in response to the signal VID GATE of FIG. 6, to be described, to zero volts during all periods other than that corresponding to the window 28 of FIG. 1. More particularly, any video or image information outside the window 28 is removed from the video signal by the switching operation of the Y1 input of U29. The remaining video at the output of U29 is again gated by analog switch U22 (shown in the form of a relay) in response to the VID GATE signal of FIG. 6 into the integrating dc restoring error amplifier, U32A. The output of this amplifier U32A is connected back to the reference input of U29 for the normalized video creating a negative feedback loop which effectively keeps the video background level at the output of U29 at zero volts, thus serving as means for minimizing the switching transients caused by the d-c step functions resulting from gating the video signal on and off. Bleeder resistor, R73 provides an error path to keep the output offset at zero volts when there is no video and the analog switch U22 does not gate on. The U0 input of U29 is used as the automatic gain control (AGC) input. A control voltage is fed-back into this input from the video peak detectors to be described with reference to FIG. 5, to keep the output of U29 at approximately one volt which corresponds to the normalized voltage of the composite video signal 16 at pins C1 and C2.

In general, the autotracker 18 is a contrast or edge tracker. More particularly, the autotracker 18 is designed to lock on the edges of a target data, that is, object 14 of FIG. 1. In general, any visible object, including object 14, on a video display 26 is visible because it has changes in brightness that define the edges of that object, such as object 14, to the eye. The degree of difference between the lightest and darkest parts of the visible object is the contrast thereof. In general, the autotracker 18 electronically looks for those same changes in brightness. The changes in the gated video output of U29 are electronically enhanced by differentiating them in the next stage that may be described with reference to FIG. 4.

The combination of capacitor C26, resistor R12, and video amplifier U14, as well as other components to be described, acts as a differentiator to enhance the rising and falling edges of the video, that is, the information defining the object 14 which is the output of the four-quadrant multiplier U29. Resistors R2 and R10 limit the amplitude of the differentiated video of object 14 to prevent video amplifier U14 from saturating. The resulting video signal comprising object 14 is now a series of positive and negative peaks, where each peak corresponds to rising and falling edges of the video input, that is, the composite video signal 16 of camera 12 applied to the autotracker 18.

Figure 4:
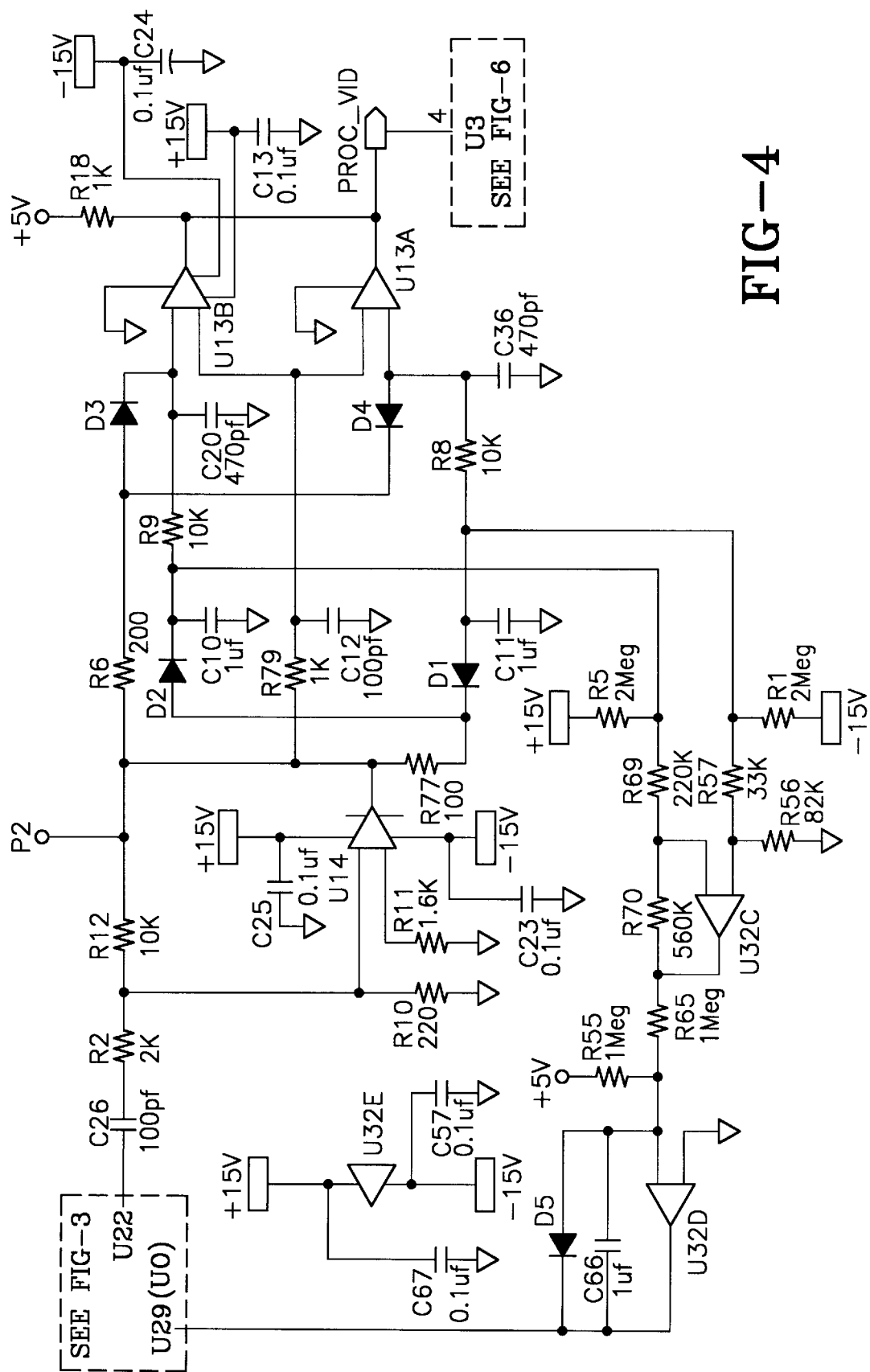
FIG. 4 is a schematic for the circuitry of the present invention including a differentiator, peak detectors and AGC error amplifier.

The next video processing stage also shown in FIG. 4, is a series of peak detectors forming a composite peak detector that provides the feedback signal for the automatic gain control, means of separating the video peaks from one another, and means for digitizing the selected peaks. Two identical peak detectors select the dominant positive and negative peaks in the window 28 with comparators U13B and U13A, respectively, along with their associated circuit components arranged as shown in FIG. 4. The outputs of the two U13 comparators are clamped to the digital logic voltage level, as shown in FIG. 4, and connected together to provide a logical NOR function, thus digitizing the absolute value of the video input, that is, the information of the object 14 derived from the composite video signal 16 of camera 12 applied to the autotracker 18. The video information now remaining in the data has been translated to time-relevant-pulses where each pulse defines the location of a significant contrast event in the composite video signal 16 confined in window 28. Resistor R77, diode D2 and capacitor C10 create the first stage of the positive peak detector. Positive video peaks are passed by diode D2 and charge capacitor C10 to a constant dc level. This level is kept constant because it is used as the source of the error signal for the AGC function discussed earlier. This voltage and its negative counterpart at capacitor C11 cooperating with diode D1 are summed by differential amplifier U32C, comprising an automatic gain control (AGC) error amplifier, and compared to a reference voltage by resistors R55 and R65. The error voltage is amplified and integrated by amplifier U32D and sent to input U0, previously discussed with reference to FIG. 3, of the four-quadrant-multiplier U29 to complete the AGC loop. An integrating capacitor C66 delays the error signal to allow the AGC to ignore transient changes in brightness, that is, transient changes in brightness of the composite video signal 16. Diode D5 prevents the control voltage at the U0 input from going negative and damaging the U0 input, which, in turn, would damage U29.

The first stage of the positive peak detector of FIG. 4 starts the process of isolating the desired target information, that is, the information of object 14 of FIG. 1, by separating the larger peaks from the background video. The voltage at capacitor C10 is used as the baseline reference voltage for comparator U13B applied thereto through resistor R9. Differentiated video, that is, the output of video amplifier U14 is compared to the reference at U13B and the peaks exceeding the reference voltage are digitized. The value of capacitor C10 is selected to provide an average of the peaks over the entire video frame related to the composite video signal 16. Resistor R79 and capacitor C12 filter noise spikes from the video contained in the image of object 14, that is, the output of video amplifier U14 before the comparison is performed. When no video is present in the object 14, the voltage at capacitor C10 is biased positive by resistors R69 and R5 to prevent noise on the video input from triggering the comparator U13B. The number of positive peaks, contained within the object 14 at the output of video amplifier U14 and serving as target data, affects the amplitude of the voltage at capacitor C10. As the number increases, the voltage increases. This helps the comparator U13B to pickout only the higher level peaks contained in the output signal of the video amplifier U14 that were derived from the composite video signal output of the camera 12.

The second stage of the positive peak detector now separates the one or two highest peaks on each video line, that is, those related to the information of the object 14 included in the composite video signals 16 applied to pins C1 and C2, from all the others. The second stage is identical to the first stage of the positive peak detector except it has a faster time constant. Positive video peaks are passed by resistor R6 and diode D3 to charge capacitor C20 just as before described for the first stage. The value of capacitor C20 is selected to average the peaks occurring inside the window 28 on a single horizontal line of the operator's display panel 26. Again, it should be recognized that the information within window 28 is that of object 14 as shown in FIG. 1. This charging of capacitor C20 raises the U13B comparator reference voltage with each video peak present on the applied, differentiated video data derived from the composite video signal 16 and which also is present on the output of the video amplifier U14. The forward voltage drop across diode D3 prevents the reference voltage from ever exceeding the highest peaks of the differentiated video, that is, the output of the video amplifier U14, but only those highest peaks are then detected. The negative peak detector uses diodes D1 and D4 and comparator U13A to perform the same function for the negative video peaks present at the output of the video amplifier U14.

The gain of error amplifier U32A of FIG. 3 of the dc restorer circuit described earlier, is intentionally limited by resistor R60 to allow the operator to have a small amount of control over the black-to-white and white-to-black target sensitivity of the autotracker 18. The low gain of the error amplifier U32A allows a small offset voltage at the output of U29, adjustable by the operator's video brightness control (not shown, but known in the art) at his/her console, such as at the operator's console 20 of FIG. 1. The offset voltage changes the relative amplitudes of the positive and negative video peaks with respect to each other, allowing the operator to select either leading or trailing edges of a target manifested in the information of object 14. Resistors R62 and R64 establish an offset bias at the output of the error amplifier U32A equal to the typical input level of the normalized video inside the window 28 of the operator's display panel 26. This offset bias establishes a zero-volt offset at the output of U29 typically when the operator's video brightness control is set at nominal. The present invention allows the operator to adjust the contrast and brightness parameters of the object 14 being viewed on the operator display panel 26 and, thus, adjust the sensitivity for detecting and monitoring the object 14.

Figure 5:
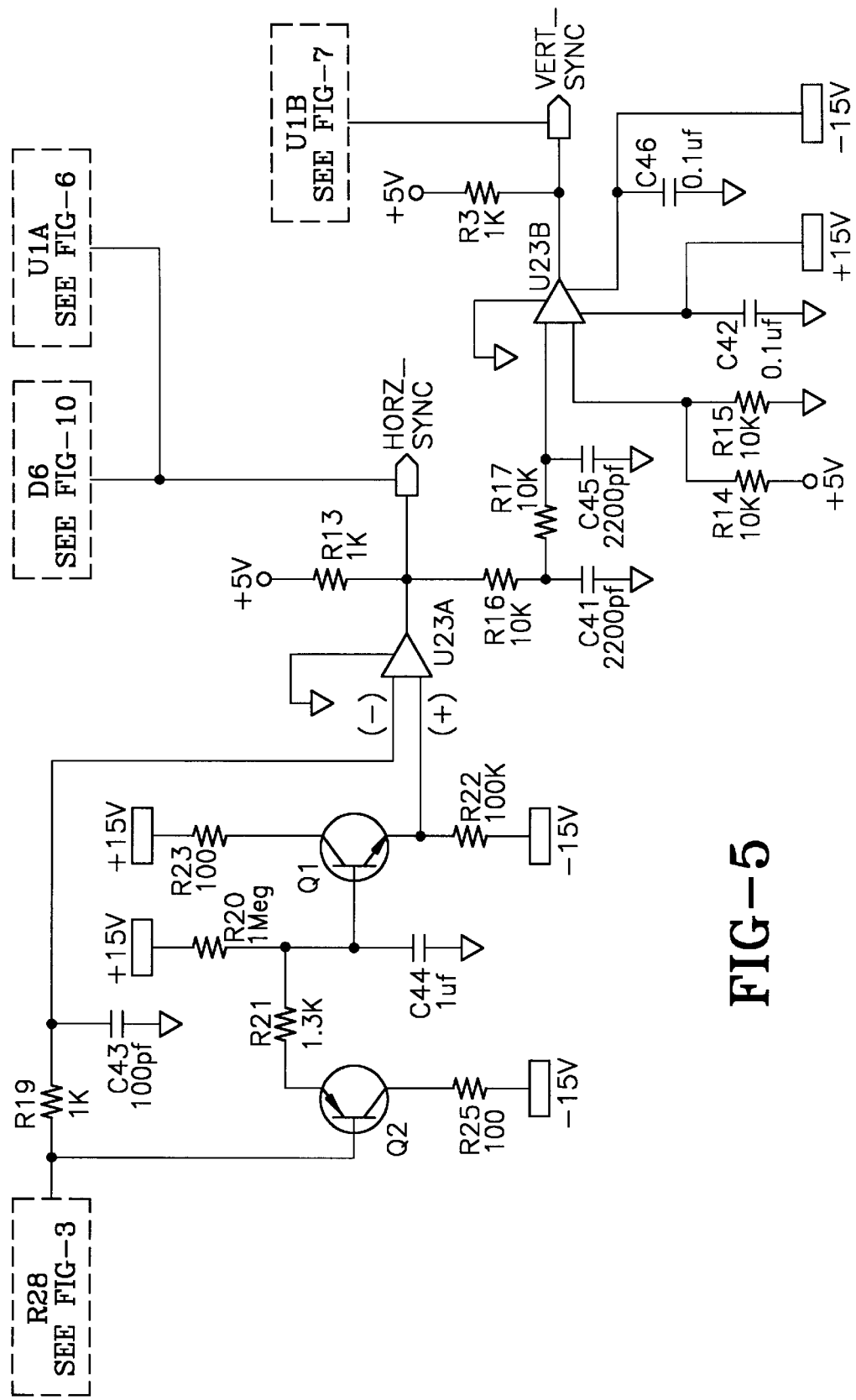
FIG. 5 is a schematic for synchronization separator of the present invention.

Horizontal and vertical synchronization signals are extracted from the composite, normalized video signal 16 of FIG. 2 located at the output of resistor R28 which is routed to the circuit arrangement of FIG. 5 of the synchronization separator of the present invention. The extraction is accomplished by the operation of transistors Q1 and Q2 and comparators U23A and U23B. Q1 and Q2 create a peak detector that establishes the amplitude of the sync pulse tips in the composite video signal 16. The composite video signal 16 charges capacitor C44 through emitter follower transistor Q2 and resistor R21 during each sync interval (see FIG. 2). Resistor R20 provides the bias current to transistor Q1 and the discharge path for capacitor C44 between sync pulses. Emitter follower transistor Q1 provides a high impedance buffer for the voltage at capacitor C44 and compensates for the voltage offset created by the base-emitter junction of transistor Q2. The composite, normalized video signal 16 is filtered for noise spikes by resistor R19 and capacitor C43 and compared by comparator U23A via the (−) input thereof to the dc sync tip level established at the emitter of transistor Q1. The resistance ratio of resistors R21 and R20 establishes a fixed offset between the actual sync tip level and where the comparison of U23A is made, allowing a more stable measurement at a higher location on the leading edge of the sync pulses contained in the composite video signal 16. The output of U23A is the separated composite sync signal serving as the horizontal synchronization (HORZ-SYNC) signals or pulses for the autotracker counter means and limited to a digital logic level by resistor R13. The leading edges of the separated composite sync signal are coincident with all horizontal synchronization so no further processing is necessary to obtain horizontal sync signals. The vertical synchronization signals for the autotracker counter means is extracted from the composite sync by filtering the horizontal synchronization pulses out of the signal. The filtering is done with resistors R16 and R17 and capacitors C41 and C45. Amplifier U23B digitizes the filtered vertical sync (VERT-SYNC) signals and limits its amplitude to a digital logic level with resistor R3.

In general, the autotracker 18 comprises counter means that controls the movement and location of the crosshairs and window displayed on the operator's display panel 26. The counter means assigns a coordinate position to every location on the operator's display panel so that the content of the information to be displayed is located by the counter means. The counter means has at least one preloaded quantity and is responsive to the digitized horizontal and vertical synchronizing signals of FIG. 5 and processor means to be described hereinafter with reference to FIG. 6. The counter means uses the same synchronization signals used by the deflection control circuits of the operator's display device 26 of FIG. 1 provided by camera 12 in composite video signal 16 and a fixed pattern corresponding to the preloaded quantity so that said fixed pattern is displayed in the central region of the display device 26. More particularly, the fixed pattern preferably comprises the rectangular box 28 that is dissected by the crosshairs comprising horizontal and vertical lines 30 and 32, respectively, and in which is confined the object 14. As used herein, the location of the fixed pattern in the central region of the display device 26 corresponding to the preloaded quantity may be referred to as the HOME position.

The autotracker 18 further comprises processor means for receiving the target data, that is, the object 14 information and providing first and second sets of signals, with the first set of signals being applied to the counter means to cause the target data to be displayed in correspondence with the fixed pattern, and the second set of signals creating steering signals to cause the camera 12 to track the object 14. More particularly, the target data, that is object 14, is displayed within the rectangular box 28 of FIG. 1 and the autotracker 18 provides the appropriate steering signals 36 on signal path 34 which, in turn, are applied to the camera directing circuits 24 that cause the camera 12 to track the object 14.

The appropriate signals on signal path 34 are, as will be further described, controlled by the contents of the counter means which, in turn, are controlled by the processor means. The location of the displayed target data, that is, the object 14 controlled by horizontal and vertical synchronization pulses may be described with reference to FIG. 6 illustrating video processor/vertical centroid/synchronizer provided by processor U3 which is a programmable logic device, horizontal window position counter, and horizontal pixel position logic.

Horizontal control and timing provided by the autotracker 18 are totally digital. A nine-bit horizontal window-position counter, made-up of counter U4B and presettable counters U2 and U5 is started each time a horizontal sync signal edge is detected at the reset (R NOT) input of latch U1A. Counter U4B is toggled by oscillator U9, for which a frequency is selected to be just over 512 times the repetition rate of the horizontal sync signal developed by the circuit arrangement of FIG. 5. This results in each horizontal location on the video display of the object 14 being mapped to one of 512 unique addresses. Pin 12 (one of the outputs) of U5 is logically true during the last 32 pixel periods of the counter before it reaches its terminal count. The 32 periods represents one-sixteenth of the display screen width and is used as the horizontal window 28 period. The window 28 which was discussed earlier with reference to FIG. 1, is centered on the display screen of the operator's display device 26 by loading the inverse of the position into the preset inputs of the counters U2 and U3 of FIG. 6 with latch U15 before latch U1A is reset. The preset position is programmed into U16 and is loaded into U15 whenever a HOME command, to be described hereinafter with reference to FIG. 7, is given to pin 13 of U16. A second synchronous horizontal pixel-position counter U6A is started each time the first counter (made up of the counters U4B, U2 and U5) is started. The second counter, however, is reset to zero each time U1A presets the other counter. The output of counter U6A is input into a programmable logic device (PLD) U16 and gated by the U16 to clock U1A logically true when the pixel count, quantifying the position of where information is displayed on the operator's display panel 26, gets to the right edge of the display screen. This action then resets counter U6A via the (R NOT) input of U6A until the next horizontal sync signal edge is detected by latch U1A and restarts the cycle.

Very similar circuitry relative to those for the horizontal control is provided for vertical control of the autotracker 18 and may be further described with reference to FIG. 7 illustrating circuitry that includes vertical window position counter, vertical pixel position logic, and lock-on enable and track enable logic. The vertical sync pulse from U23B of FIG. 5 resets latch U1B of FIG. 7 to start the presettable nine-bit vertical window-position counter made-up of counter U4A and presettable counters U7 and U8. Counter U11 is part of the vertical pixel-position counter which starts counting from zero each time latch U1B is reset by a vertical sync pulse. The counters (U4A and U11) are toggled by the output at pin 5 of latch U1A of FIG. 6 each time a new horizontal raster line begins. This response defines each pixel position as one of 512 locations on each horizontal line. Pin 12 of U8 is used to define the vertical window period as a block of 32 lines in each field. The window is centered on the display screen by loading the position into the preset inputs of U7 and U8. The preset position is programmed into U17 and loaded directly into the window-position counters (U7 and U8) whenever the HOME command (generated by U28C) is presented to pin 13 of U17. When the counter comprised of counters U7 and U8 reaches its terminal value at the trailing edge of the vertical window, it clocks latch U1B true, stopping the count and causing the counters (U11, U7 and U8) to preload for the next count. The vertical window is gated by the presence of a signal at the output of logic element U21A of FIG. 6 corresponding to the occurrence of the three most significant bits of the horizontal window counter U5 of FIG. 6, to create a rectangular window 28 in the center of the video screen of the operator's display panel 26 that is twice as wide as the actual crosshair window 28 and starts 32 pixels to the left of window 28. This double-width window 28 is the video gate used to control the four-quadrant-multiplier U29 discussed earlier. The window period is started early for the analog circuits to allow the switching transients at the front of the window to settle-out and not be interpreted by the operation of differentiator, such as the video amplifier U14 of FIG. 4, on the video. The digitized video leaving the U13 comparators of FIG. 4 is then digitally gated by processor U3 of FIG. 6 to ignore those first 32 pixels that starts to the left of window 28.

Figure 6:
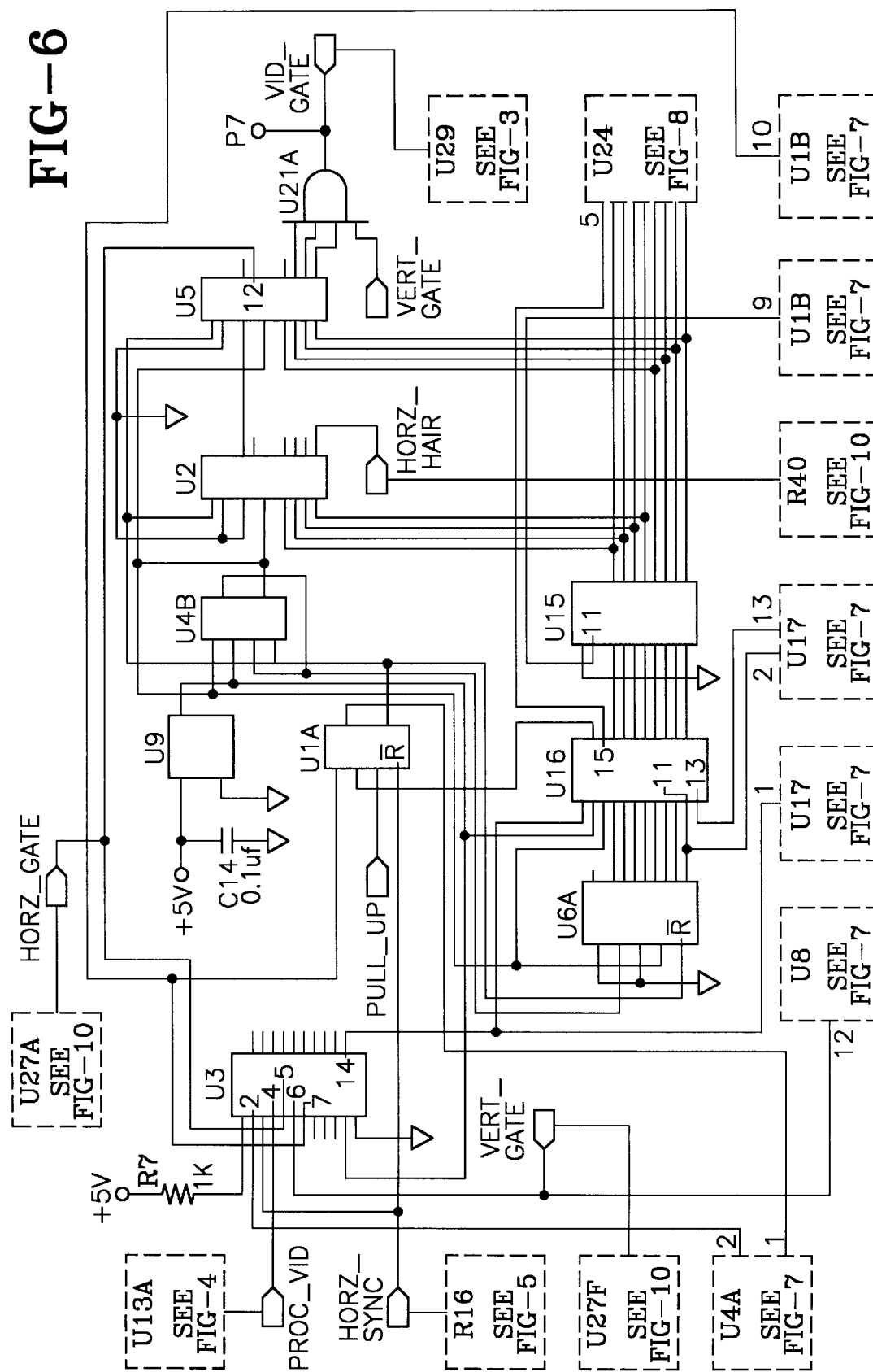
FIG. 6 is a schematic for the circuitry of the present invention including a video processor/vertical centroid/synchronizer, a horizontal window position counter and horizontal pixel position logic.
Figure 7:
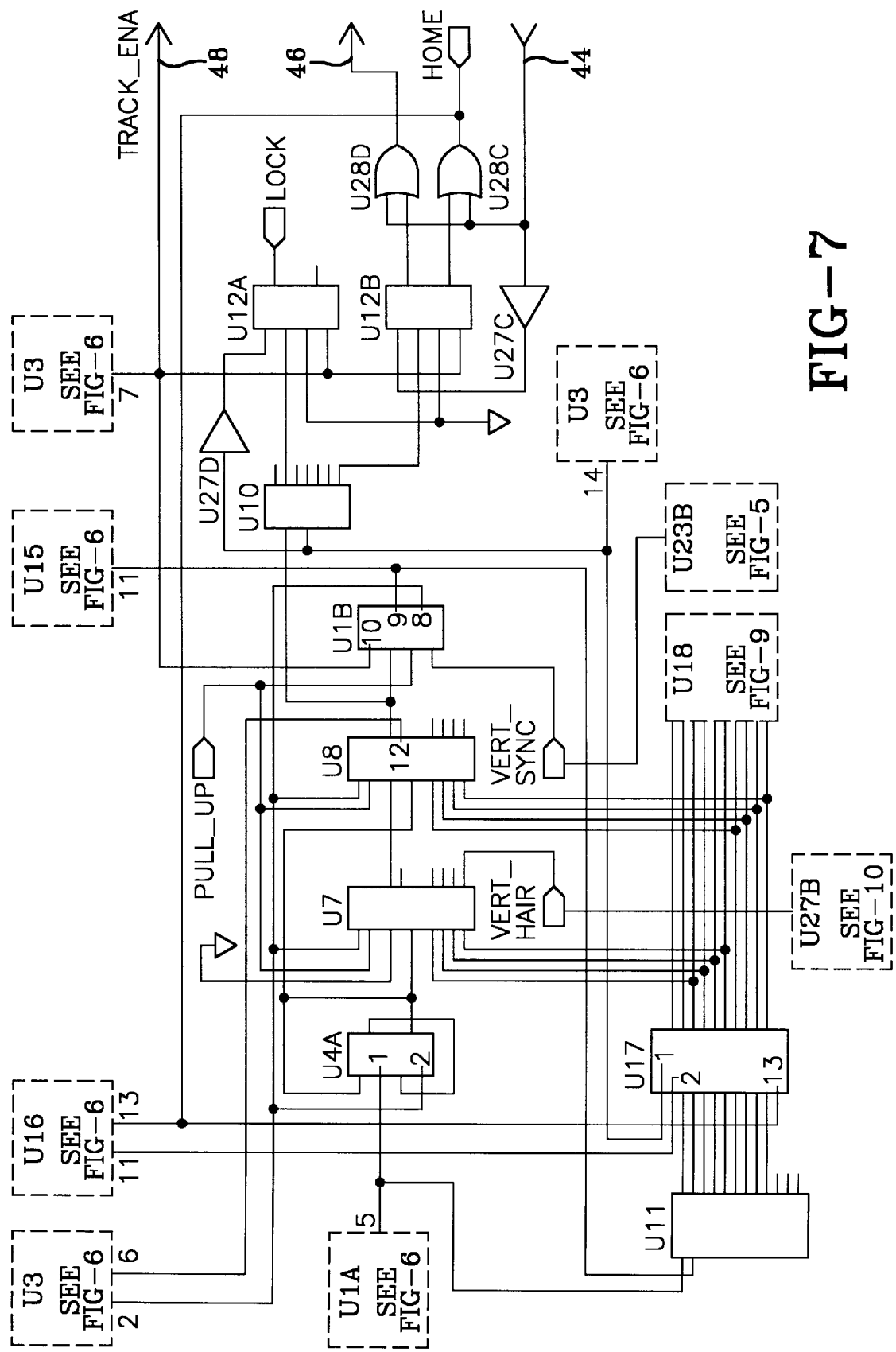
FIG. 7 is a schematic for the circuitry of the present invention including vertical window position counter, vertical pixel position logic, and lock-on enable and track enable logic.

Processor U3 of FIG. 6, operating in response to a programmed routine processes the video information digitized by the peak detectors in FIG. 4 to cause the autotracker 18 to lock on target data in the vertical center of the target or on the center of several targets in a detected cluster captured by the camera 12 of FIG. 1. The video information is gated by the processor U3 during alternate fields of the target data that the processor U3 is handling. While the data is gated-off, a counter in the processor U3 counts every horizontal line in the window, that is, the data defined within the window 28 that has video somewhere on it. During the next field of data being handled by the processor U3, the processor U3 connects the video data to output pin 14 and decrements the counter by two each time a line in the window to be displayed on the operator's display panel 26 and containing video is detected. When the counter reaches zero it is prevented from counting further. At this point (contents of counter is zero) the counter has counted halfway through the data lines it had counted during the previous field and gates the video data output off, that is, the information on output pin 14 is gated off. The resulting video data output is still horizontally asynchronous, so the output video, that is, the image information of object 14 displayed within the window or rectangular box 28 on the operator's display panel 26, is also strobed with a latch in the processor U3 by the clock signal output of oscillator U9 to synchronize the video output data with the pixel positions established by the horizontal and vertical counter means described earlier.

The autotracker 18 follows a target by clocking the instantaneous value of the pixel-position counters into a latch with the isolated, processed video peak, in particular, the video data output at pin 14 of processor U3 and then transferring that position to the horizontal and vertical window-position counters of FIGS. 6 and 7, respectively, to cause the window to move, keeping the target in the center of the window. More particularly, keeping the object 14 within the rectangular box 28 on operator's display panel 26. The window position is updated after the completion of each field. The last horizontal pixel-position captured in each window by U16 of FIG. 6 is strobed into latch U15 by latch U1B of FIG. 7 when U1B presets the vertical window-position counters. The output of U15 is then used as the source of the preset data for the horizontal window-position counters. The window position is then translated into a slewing signal by digital-to-analog converters, which is used to steer the camera to move the window back into the center of the display screen and may be further described with reference to FIGS. 8 and 9 comprising horizontal digital-to-analog converter U24 (see FIG. 8 also including horizontal steering voltage output amplifier) and vertical digital-to-analog converter U18 (see FIG. 9 also including vertical steering voltage output amplifier).

In general, the digital-to-analog converters U24 and U18 of the autotracker 18 provide the appropriate analog steering signals 36 on signal path 34 (see FIG. 1) that is applied to the camera directing circuit 24, which in a manner known in the art, causes the camera 12 to follow the object 14 as the object 14 moves. Signal path 34 is identified in FIG. 7 as comprising signal path manual override 46 and also in FIG. 8 as comprising signal path horz slew 34 and also in FIG. 9 as comprising signal path vert slew 34.

The synchronized video from pin 14 of the processor U3 derived from the composite video signal 16 of FIG. 1 of object 14 is used by logic element U16 of FIG. 6 to latch the pixel-position counter U6A data of FIG. 6. The last video data pulse will capture a number equal to the location of the pixel at which it occurred. The logic element U16 then algebraically adds 16 pixel positions to the number and uses it as the preload for the U2 and U5 horizontal window-position counters of FIG. 6 defining the horizontal parameters of window 28 of FIG. 1. The 32-pixel window will move to keep the latched pixel position in the center of the window 28. The vertical pixel-position counter U11 and logic element U17 of FIG. 7 performs an identical function as that of counter U6 and logic element U16. The synchronized video provided at pin 14 of U3 is used as a clock signal to latch the number of the horizontal line on which the last video pulse occurred. The number 16 is algebraically added to the number and the sum preloaded into counters U7 and U8 comprising the vertical window-position counter to define the new position of the window. When the HOME signal at pin 13 of the logic elements U16 (horizontal) and U17 (vertical) is true, the latched data is overridden by the preprogrammed values discussed earlier, and returns the rectangular window 28 to the center of the screen of the operator's display panel 26.

The digital position data used to preload the counters (both the horizontal and vertical window-position counters) is also the input of the two digital-to-analog converters U24 and U18. The converters and their associated amplifiers, U25B and U26B respectively, output a +5 volt to −5 volt dc level proportional to the location of the window on the video display screen. The digital-to-analog converters U24 and U18 outputs are calibrated to be zero volts when the rectangle window 28 is in the HOME position, that is, when the rectangular box 28 of FIG. 1 is in the center of the screen of the operator's display panel 26 of FIG. 1. Amplifier/mixers U25A and U26A amplify the horizontal and vertical levels, respectively, to the level expected by the camera directing circuits 24, which in this application is +12 volts to −12 volts. These voltages are the steering signals sent to the camera directing circuits 24 on signal path 34 to force the camera 12 to always keep the window in the center of the screen even if the target, that is, object 14 is trying to pull the window, that is, the rectangular box 28 somewhere else.

Figure 8:
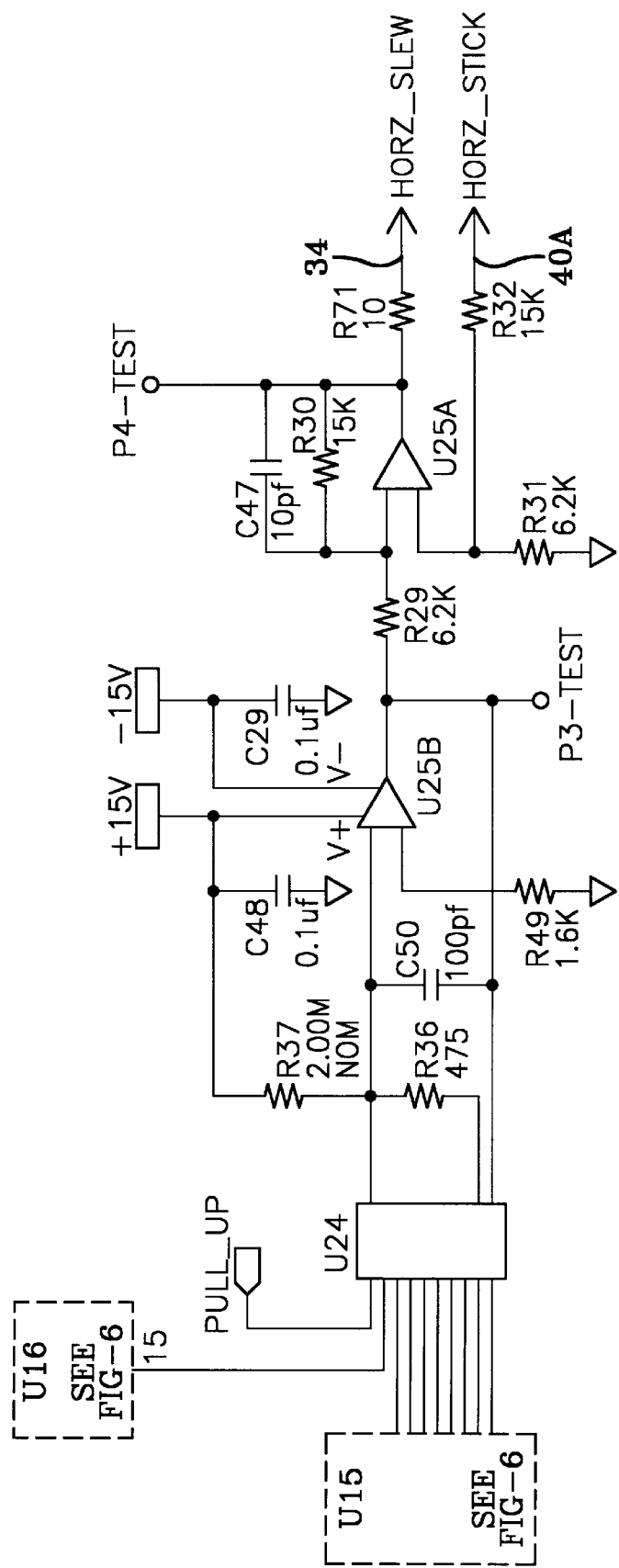
FIG. 8 is a schematic for the circuitry of the present invention including a horizontal digital-to-analog converter and horizontal steering voltage output amplifier.
Figure 9:
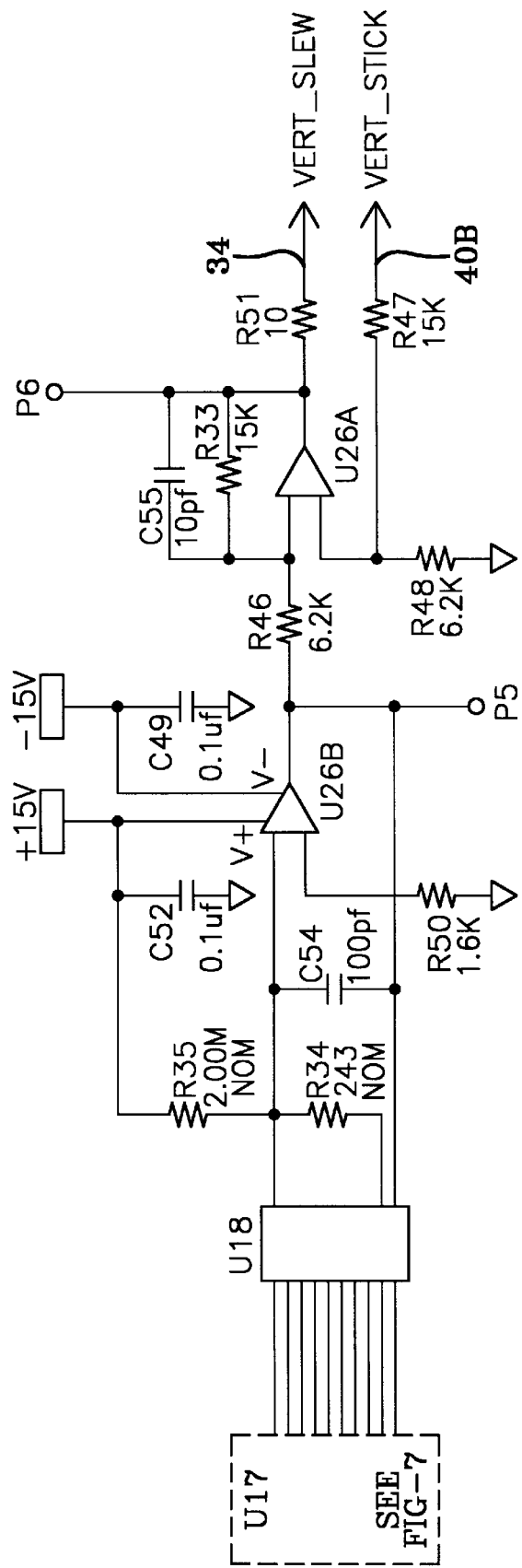
FIG. 9 is a schematic for the circuitry of the present invention including a vertical digital-to-analog converter and vertical steering voltage output amplifier.

With reference to FIG. 1, it is seen that autotracker 18 is interposed, via signal paths 40 and 34, between the operator's console 20 and the camera directing circuits 24. Without the benefits of the present invention, the operator's console 20 circuitry would develop the command signals that would be applied to the camera directing circuits 24, for the generation of the steering signals 36 on signal path 34. However, with regard to the present invention, the output of the operator's console 20 is routed, via signal path 40, to the autotracker 18. The autotracker 18 intercepts the commands, such as those of a joystick 22 or some other steering device, that would normally cause the generation of the steering signals 36. Even though the autotracker 18 intercepts these commands, the operation of the autotracker 18 needs to be subordinate to the commands initiated by the operator, especially if the operator is controlling an aircraft or some other operator responsive device. Therefore, the joystick 22 or steering command signals coming from the operator's console 20, should not be interrupted and may be further described with reference to FIGS. 8 and 9 respectively illustrating circuit arrangements including amplifier/mixers U25A and U26A. FIG. 8 illustrates the signal path 40 of FIG. 1 as including a signal path 40A identified as horizontal stick and FIG. 9 illustrates the signal path 40 of FIG. 1 as including a signal path 40B identified as vertical stick.

To accomplish the non-interruption, the amplifier stages of U25A and U26A mix the operator's command signals on signal paths 40A and 40B with the autotracker's 18 (derived from amplifiers U25B and U26B), thereby, allowing both inputs to steer the camera 12.

Figure 10:
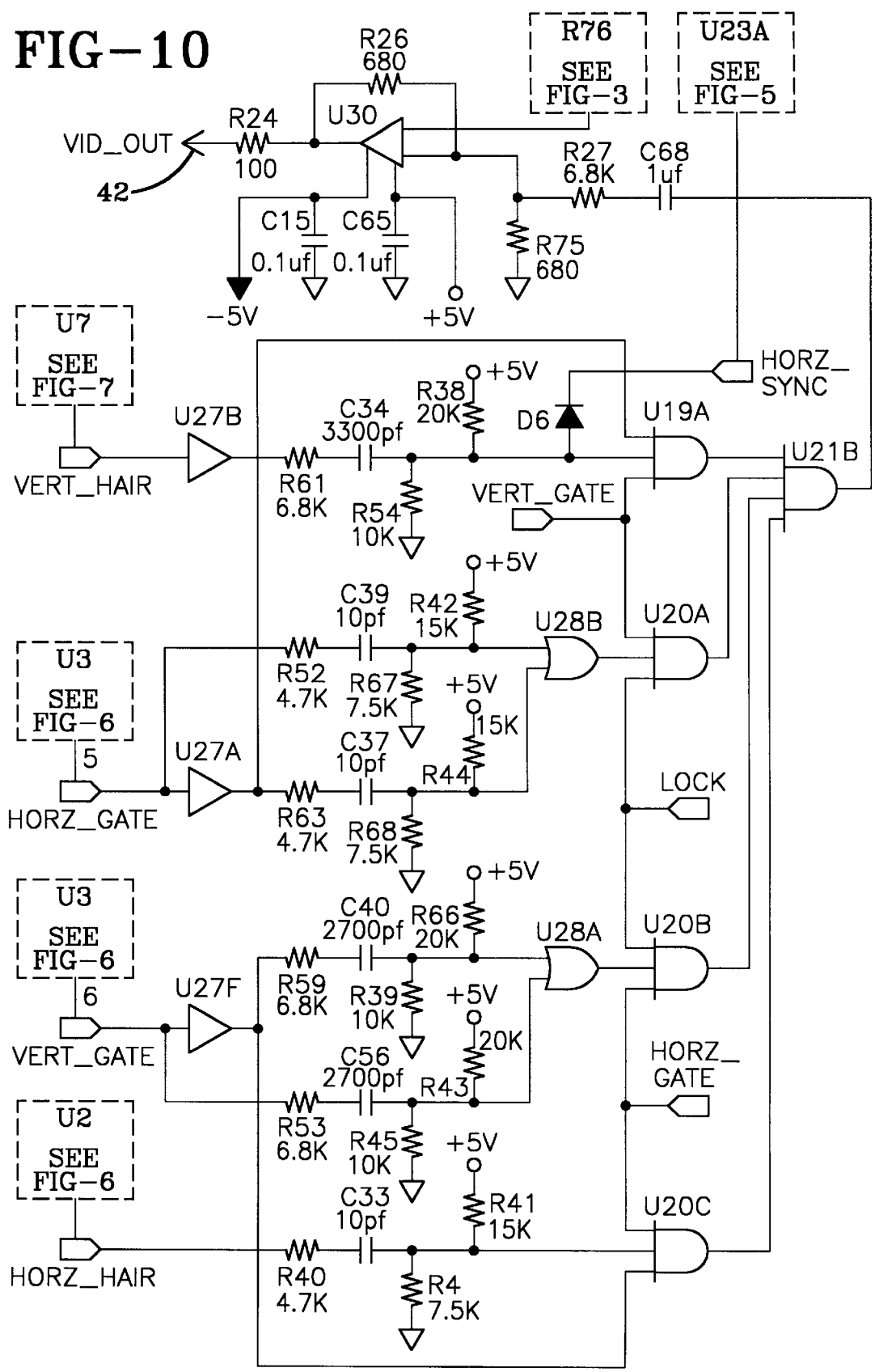
FIG. 10 is a schematic for the crosshair generator and crosshair mixer/output amplifier of the present invention.

The horizontal and vertical window gating signals discussed earlier, are used to display the position of the window on the screen of the operator's display panel 26 and may be further described with reference to FIG. 10 illustrating circuitry including a crosshair generator and a crosshair mixer/output amplifier. The positive-going edge of the horizontal window signal applied to logic element U27A is differentiated by resistors R52, R67, R42, and capacitor C39. The negative-going edge of the horizontal window signal present on the output of logic element U27A is differentiated by resistors R63, R68, R44 and capacitor C37. The voltage spikes resulting from the differentiation are digitized and gated during the vertical window period and input into video amplifier U30 serving as the crosshair mixer/output amplifier. Video amplifier U30 mixes crosshair and operator prompt data with the normalized video developed from the composite video signal 16 discussed earlier and outputs it to the operator's display panel 26 on signal path 42. The mixed signals output of the video amplifier U30 appear on the operator's display panel 26 as two white lines defining the left and right sides of a small rectangle in the center of the display screen. More particularly, the small rectangle corresponds to the rectangular box 28. The positive-going edge of the vertical window signal applied to logic element U27F is differentiated the same way as described for the horizontal window gating signal by capacitor C56 and the negative-going edge located at the output stage of logic element U27F is differentiated the same way by capacitor C40 and their associated resistors. These differentiated signals of the vertical window gating signals are digitized and gated during the horizontal window period and added to the video signals above by way of gate U21B. These signals appear on the operator's display panel 26 as two white lines defining the top and bottom of the rectangular box 28. The rectangular box 28 outlines the 32-pixel by 32-line window inside of which an object 14 is a potential target.

A crosshair for the operator's display panel 26 is created by differentiating the most significant bit in window-position counters U2 (FIG. 6) and U7 (FIG. 7). More particularly, the crosshair is defined by the horizontal (30) and vertical (32) lines of FIG. 1 that intersect the rectangular box 28 of the operator's display panel 26. These signals defining lines 32 and 30, respectively, have a leading edge that is coincident with the center of the horizontal window period and a trailing edge in the center of the vertical window period. The differentiated leading edge of the horizontal counter output is digitized and gated-on during the horizontal window period, gated-off during the vertical window period and added to amplifier U30 by way of gate U21B of FIG. 10.

The resulting signal appears on the video display screen of the operator's display panel 26 as a thin white vertical line 32 running the length of the screen, in the center of the screen, but with a gap in the line where the window 28 would be. The differentiated trailing edge of vertical counter U7 of FIG. 7 is gated-on during the vertical window period and gated-off during the horizontal window period, and added to U30 by way of gate U21B of FIG. 10. The resulting video display is a white horizontal line 30 running the length of the screen, in the center of the screen, but with a gap where the rectangular box 28 would be.

The white rectangle box 28 is used as an operator prompt to inform him/her that the object 14 he/she is attempting to track has enough contrast for him/her to lock on it. At the end of each field, counter U10 of FIG. 7 is incremented. If any video or image information related to object 14 is detected the counter is reset. If two consecutive fields occur with no detectable object in the window, latch U12A of FIG. 7 will be clocked to a logic zero. This will cause gates U20A and U20B of FIG. 10 to extinguish the white rectangle, that is, rectangular box 28. As soon as video or image information related to object 14 is detected again, the window latch U12A is set and the rectangular box 28 is illuminated. If the strength of the signal, that is, object 14 is marginal, the rectangular box 28 will appear to fade or blink.

Figure 11:
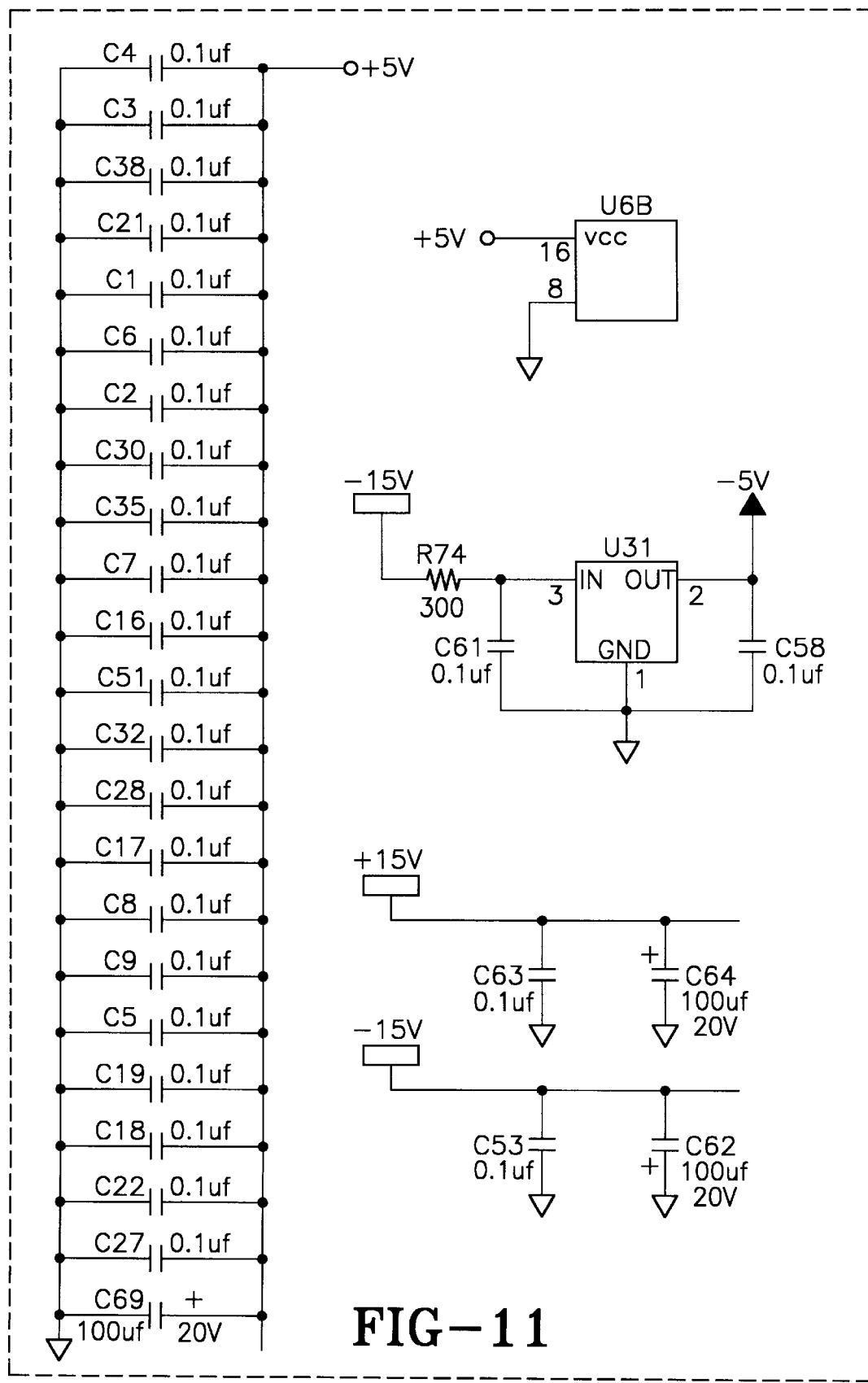
FIG. 11 is a schematic for the arrangement of the primary power input and filtering of the present invention.

It is preferred that the excitation supplied to the components shown in FIGS. 3–10 receive proper filtering and such filtering is shown in the circuit arrangement of FIG. 11.

In operation, and with reference to FIGS. 1–10, the operator initiates tracking with his/her manual override switch (not shown) located on the operator's console 20. one system, without the benefits of the autotracker 18 of the present invention, has a trigger switch on the joystick which is the source of the manual override signal 44. Steering signals are not accepted by the camera directing circuits unless the trigger is squeezed. When the trigger switch is released the camera is locked in that position. The present invention accommodates this trigger switch command. The autotracker 18 intercepts the trigger switch command signal and connects it to signal path 44 shown in FIG. 7. If the autotracker 18 is not locked on a target the window, that is rectangular box 28, will be frozen in the center of the display screen because latch U12B of FIG. 7 is reset holding the HOME command true. Squeezing the trigger and causing the logic level at signal path 44 to be true still holds the HOME command true with gate U28C of FIG. 7, but the squeezed trigger sets latch U12B of FIG. 7. So now when the trigger is released and signal path 44 returns to a logic zero, the HOME command will go to zero and the autotracker 18 window 28 will begin following any object that was in the window 28 at the time. When the trigger on joystick 22 is squeezed, the manual override signal of the operator's console 20 is forwarded through gate U28D of FIG. 7 to the camera directing circuits 24, via signal path 4 6. The operator may slew the camera as normal. This squeezing action will allow him/her to move an object 14 he/she wishes to track into the window. Releasing the trigger switch locks the autotracker 18 on the object 14. If the autotracker 18 has successfully locked on a target, such as object 14, the autotracker 18 will not allow the manual override signal going to the camera directing circuits 24 to return to logic zero. Latch U12B of FIG. 7 holds it true. The steering voltages will now come from the autotracker 18 digital-to-analog converters discussed earlier, instead of the operator.

The autotracker 18 will disable itself if the object disappears. If 64 consecutive fields of data related to the object 14 occur with no video or image information (about one second) latch U12B is clocked low by counter U10 of FIG. 7, allowing the manual override 46 to return to logic zero and forcing the digital-to-analog converter outputs of FIG. 8 and FIG. 9 to zero volts with the presence of the HOME command.

The autotracking function, of the autotracker 18, can be disabled completely by an external control line on signal path 48 of FIG. 7. A track enable input identified as TRACK-ENA on signal path 48 going to a logic zero will force the window to its HOME position by resetting latch U12B. This holds the digital-to-analog converters of FIGS. 8 and 9 at zero volts as discussed earlier. The track enable input also disables the horizontal and vertical position counters by not allowing latches U1A and U1B to be reset by the horizontal and vertical sync signals. This extinguishes the crosshair and window lines on the screen of the operator's display panel 26 and disables all analog activity by not providing a gate signal for the multiplier U29 of FIG. 3. Finally, the track enable input gates-off the video at processor U3 of FIG. 6 disabling and resetting all remaining digital activity.

It should now be appreciated that the present invention provides a stand-alone video autotracking device 18 designed to be inexpensively added into an existing remotely controlled camera system without extensive modifications to that system. The autotracker 18 extracts data from the composite video output of a camera 12 and uses it to electronically isolate an object 14 in the video or image information of the composite video signal 16, follow the object with a crosshair added to the video by the autotracker 18, and create steering signals for the camera directing circuits to cause the camera to automatically follow the object 14 as it moves.

It should be further appreciated that the autotracker 18 of the present invention is an external, autonomous device capable of extracting all of the data necessary to operate the autotracker 18 from a single composite video output signal 16 of a camera 12 or video source. This allows the autotracker 18 to be added to existing systems that were never intended to have this feature. The autotracker 18 has features that allow the operator of the camera to adjust the sensitivity of the autotracker to different targets by adjusting the contrast and brightness of the camera output. The autotracker 18 is designed to be inexpensively added into an existing remote controlled camera system without modification of that system, yet performs as if it were integrated.

Many modifications or variations of the present invention are possible in view of the above disclosure. It is, therefore, to be understood, that within the scope of the appended claims, the invention may be practiced otherwise than as specifically described.

What I claim is:

1. An autotracking device for a video control system that produces composite video signals containing image signals and synchronization signals, said video control system having a display device with directing circuits responsive to steering signals for causing the movement of a camera of said video control system, said autotracking device comprising:

(a) means for receiving and normalizing said composite video signals to a predetermined level;

(b) means for extracting a preselected portion of the composite video signals so as to isolate object information thereof, said information of said preselected portion having a transition rate that exceeds a predetermined value;

(c) means for detecting said transitions of said preselected portion and separating one transition from another;

(d) means for comparing said separated transitions against a reference and generating a corresponding output signal when each of said transitions exceeds said reference;

(e) means for comparing the corresponding output signals against each other to determine the dominant transition therebetween;

(f) means for digitizing the dominant transition value into digital data serving as target data;

(g) means for extracting horizontal and vertical synchronizing signals from said normalized composite video signals;

(h) means for digitizing the extracted horizontal and vertical synchronizing signals;

(i) counter means having a preloaded quantity and responsive to said digitized horizontal and vertical synchronizing signals, said counter means being synchronized to said display device, said counter means providing a fixed pattern corresponding to said preloaded quantity, said fixed pattern being displayed in the central region of said display device; and (j) processor means for receiving said target data and providing first and second sets of signals with the first set of signals being applied to said counter means to cause said target data to be displayed in correspondence with said fixed pattern and the second set of signals serving as said steering signals to cause said camera to track said object.

2. The autotracking device according to claim 1 further comprising an automatic gain control (AGC) circuit that holds said preselected portion of the normalized composite video signal at a predetermined level.

3. The autotracking device according to claim 1 further comprising means for minimizing step function gating noise from being interpreted as video transitions of said preselected portion of said normalized composite video signals.

4. The autotracking device according to claim 1, wherein said means for detecting said transition further comprises;

differentiating means for receiving said transitions of said preselected portion having rising and falling edges and providing positive and negative peaks corresponding to said rising and falling edges of said preselected portion.

5. The autotracking device according to claim 1, wherein said means for extracting horizontal and vertical synchronizing signals further comprises first filter means for filtering said normalized composite video signals.

6. The autotracking device according to claim 1, wherein said means for extracting horizontal and vertical synchronizing signals further comprises second filter means for filtering said normalized composite signal to remove said horizontal synchronizing signal therefrom resulting in said vertical synchronization signals.

* * * * *